United States Patent
Tang et al.

(10) Patent No.: US 10,468,933 B2
(45) Date of Patent: Nov. 5, 2019

(54) BRUSHLESS DC MOTOR

(71) Applicant: Zhongshan Broad-Ocean Motor Co., Ltd., Zhongshan (CN)

(72) Inventors: Songfa Tang, Zhongshan (CN); Yonghua Wu, Zhongshan (CN)

(73) Assignee: ZHONGSHAN BROAD-OCEAN MOTOR CO., LTD., Zhongshan (CN)

(*) Notice: Subject to any disclaimer, the term of this patent is extended or adjusted under 35 U.S.C. 154(b) by 256 days.

(21) Appl. No.: 15/368,509

(22) Filed: Dec. 2, 2016

(65) Prior Publication Data
US 2017/0085147 A1 Mar. 23, 2017

Related U.S. Application Data

(63) Continuation-in-part of application No. PCT/CN2015/090612, filed on Sep. 24, 2015, and a (Continued)

(30) Foreign Application Priority Data

Mar. 31, 2015 (CN) ...................... 2015 2 0193092 U
Aug. 15, 2015 (CN) ...................... 2015 2 0618369 U (51) Int. Cl.
*H02K 5/02* (2006.01)
*H02K 29/00* (2006.01)
(Continued)

(52) U.S. Cl.
CPC .................. *H02K 5/02* (2013.01); *H02K 5/04* (2013.01); *H02K 5/08* (2013.01); *H02K 5/16* (2013.01);
(Continued)

(58) Field of Classification Search
CPC ...... H02K 11/00; H02K 11/0094; H02K 5/02; H02K 5/04; H02K 5/14; H02K 5/22
(Continued)

(56) References Cited

U.S. PATENT DOCUMENTS 4,736,869 A    4/1988  Riback
5,772,176 A *  6/1998  Keck ........................ H02K 5/24
                                                         248/638
(Continued)

FOREIGN PATENT DOCUMENTS

CN          1373545 A      10/2002
CN        201303266 Y       9/2009
(Continued)

*Primary Examiner* — Nguyen Tran
(74) *Attorney, Agent, or Firm* — Matthias Scholl P.C.; Matthias Scholl (57) ABSTRACT

A brushless direct current (DC) motor, including a motor body and a motor controller. The motor controller includes a control box and a control circuit board. The motor body is a plastic-packaged body including a rotary shaft, a rotor assembly, a plastic-packaged stator, a front cover, and a rear cover. The rotor assembly is disposed on the rotary shaft. The plastic-packaged stator is sleeved on the outer side of the rotor assembly. The front cover is disposed on the front part of the plastic-packaged stator. The plastic-packaged stator includes a stator core, a terminal insulator, coil windings, and a plastic-packaged shell. The terminal insulator is disposed on one end of the stator core. The coil windings are coiled on the terminal insulator. The plastic-packaged shell is adapted to connect the stator core, the terminal insulator, and the coil windings together.

10 Claims, 6 Drawing Sheets

Related U.S. Application Data continuation-in-part of application No. PCT/CN2015/090111, filed on Sep. 21, 2015.

(51) Int. Cl.
| | | |
|---|---|---|
| *H02K 11/33* | (2016.01) | |
| *H02K 5/16* | (2006.01) | |
| *H02K 5/04* | (2006.01) | |
| *H02K 5/08* | (2006.01) | |
| *H02K 5/22* | (2006.01) | |
| *H02K 15/12* | (2006.01) | |

(52) U.S. Cl.
CPC ............ *H02K 5/161* (2013.01); *H02K 5/225* (2013.01); *H02K 11/33* (2016.01); *H02K 29/00* (2013.01); *H02K 15/12* (2013.01)

(58) Field of Classification Search
USPC .......................................... 310/43, 68 R, 89
See application file for complete search history.

(56) References Cited

U.S. PATENT DOCUMENTS

| | | | | |
|---|---|---|---|---|
| 6,831,382 | B1* | 12/2004 | Lyle ...................... | H02K 5/04 |
| | | | | 310/12.13 |
| 2012/0025640 | A1* | 2/2012 | Tang ..................... | H02K 5/1735 |
| | | | | 310/59 |
| 2014/0183983 | A1* | 7/2014 | Huang .................... | H02K 3/28 |
| | | | | 310/43 |
| 2015/0123501 | A1* | 5/2015 | Jang ....................... | H02K 5/08 |
| | | | | 310/43 |

FOREIGN PATENT DOCUMENTS

| | | |
|---|---|---|
| CN | 102306971 A | 1/2012 |
| CN | 202918162 U | 5/2013 |
| CN | 203554139 U | 4/2014 |
| CN | 203655871 U | 6/2014 |
| CN | 203660853 U | 6/2014 |
| CN | 204497941 U | 7/2015 |

* cited by examiner

BRUSHLESS DC MOTOR

CROSS-REFERENCE TO RELATED APPLICATIONS

This application is a continuation-in-part of International Patent Application No. PCT/CN2015/090111 with an international filing date of Sep. 21, 2015, and of International Patent Application No. PCT/CN2015/090612 with an international filing date of Sep. 24, 2015, designating the United States, now pending, and further claims priority benefits to Chinese Patent Application No. 201520193092.X filed Mar. 31, 2015, and to Chinese Patent Application No. 201520618369.9 filed Aug. 15, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a brushless direct current (DC) motor.

Description of the Related Art

Figure 1:
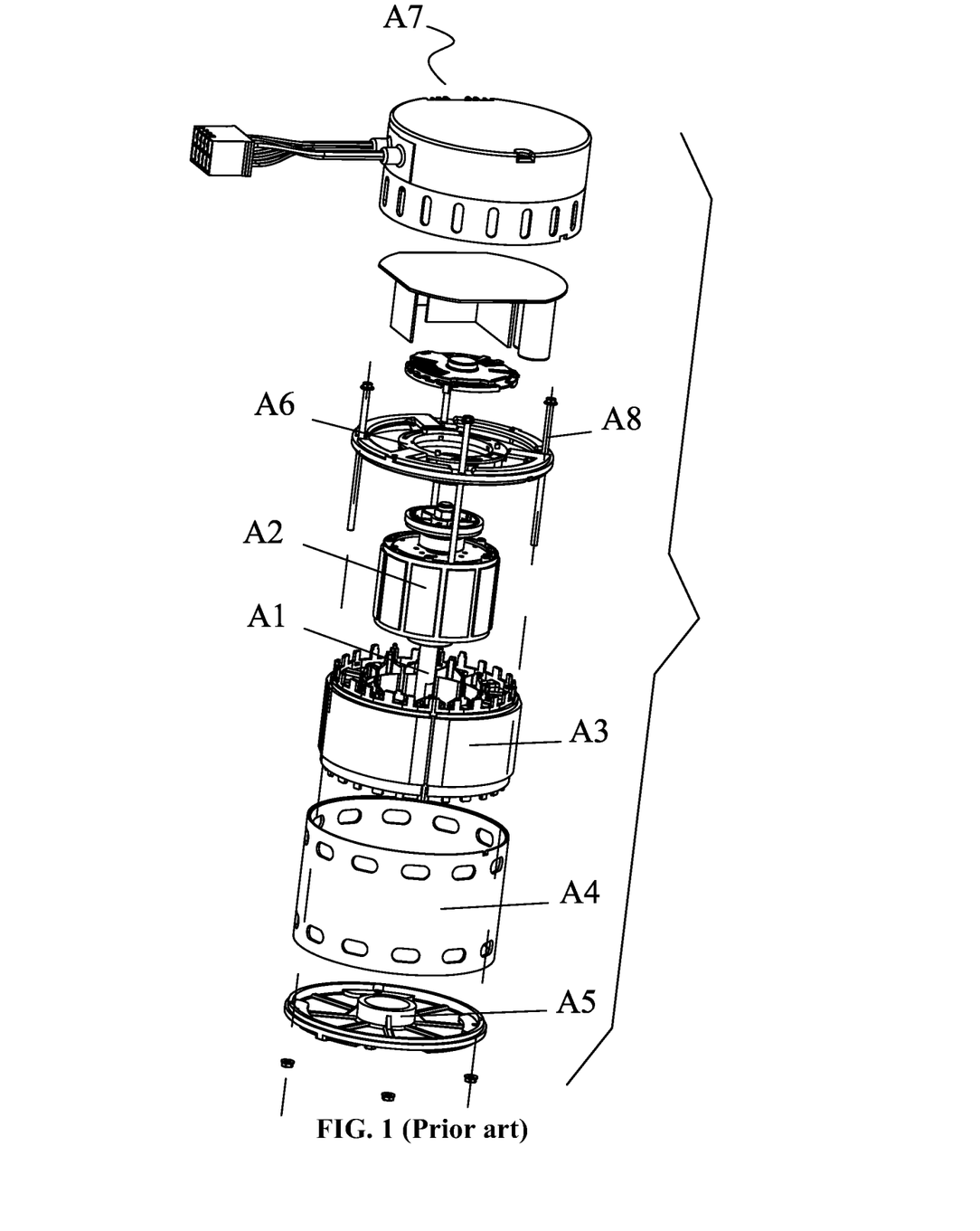
FIG. 1 is an exploded view of a brushless direct current motor in the prior art.
Figure 2:
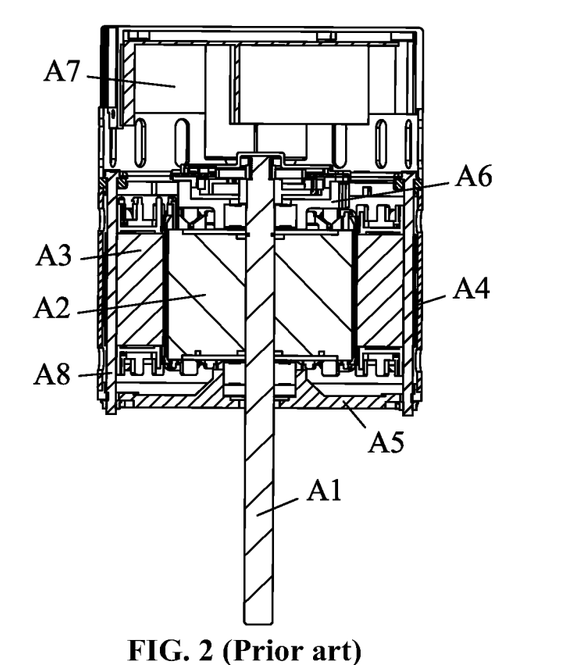
FIG. 2 is a sectional view of a brushless direct current motor in the prior art.
Figure 3:
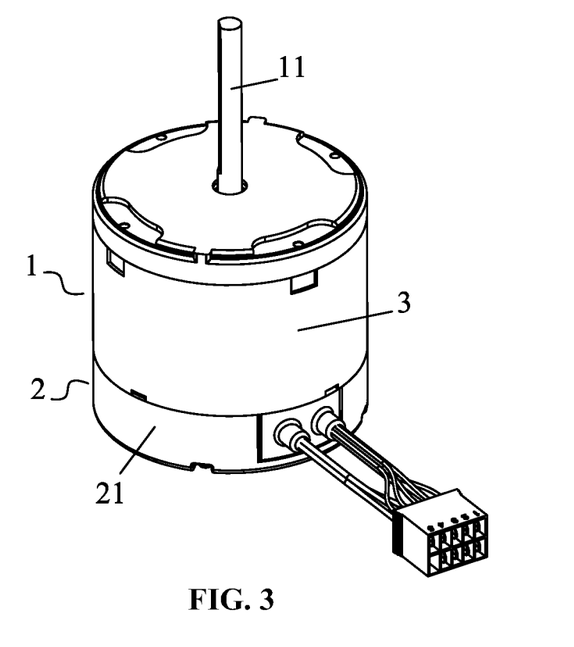
FIG. 3 is a stereogram of a brushless direct current motor in Example 1.
Figure 4:
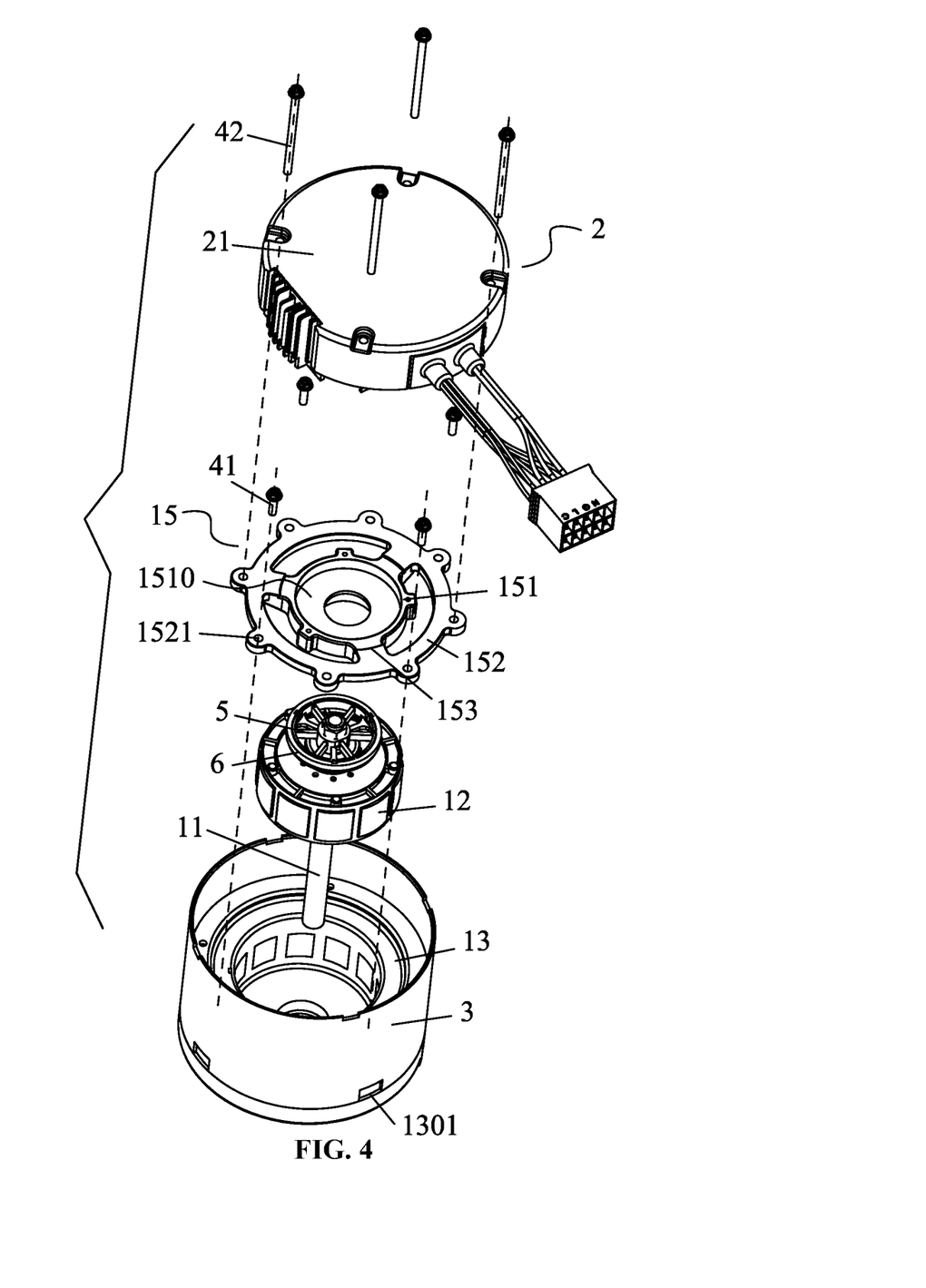
FIG. 4 is an exploded view of a brushless direct current motor in Example 1.
Figure 5:
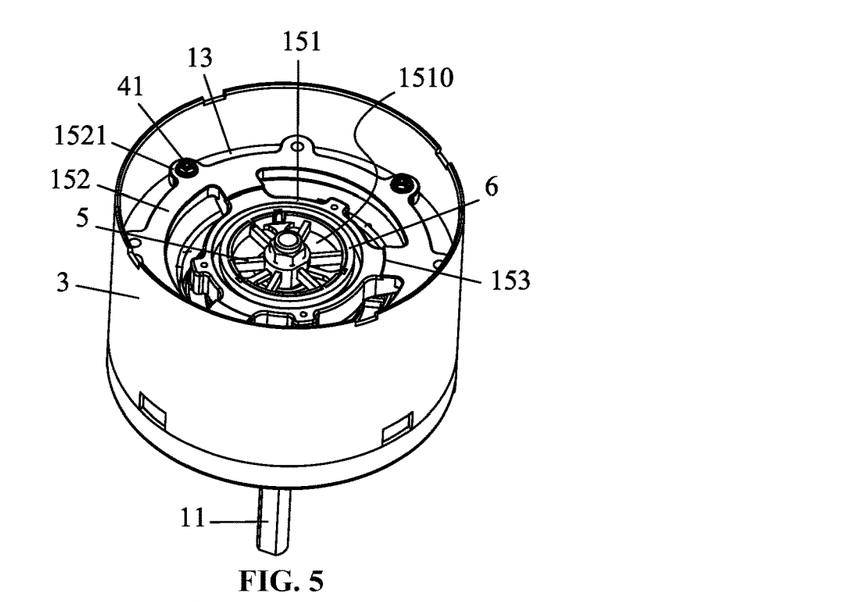
FIG. 5 is a stereogram of a motor body of a brushless direct current motor in Example 1.
Figure 6:
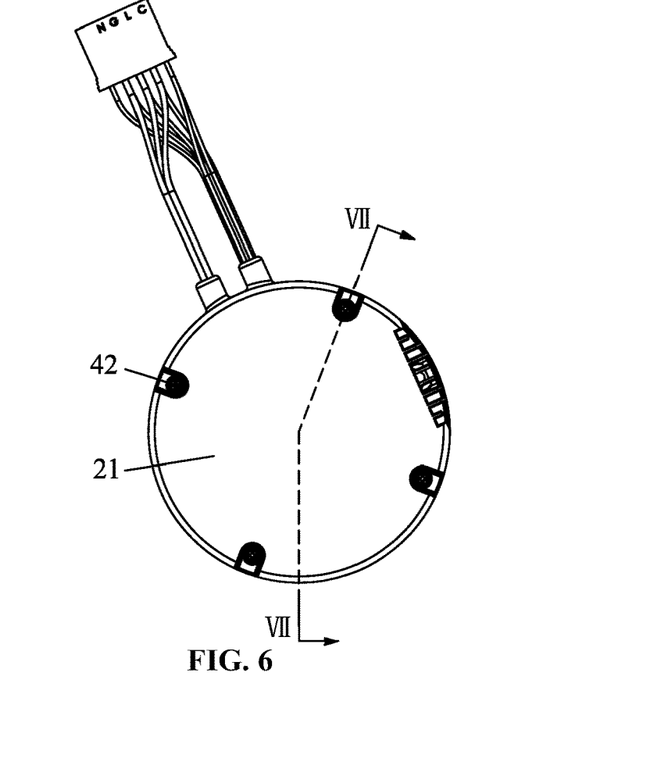
FIG. 6 is a top view of a brushless direct current motor in Example 1.
Figure 7:
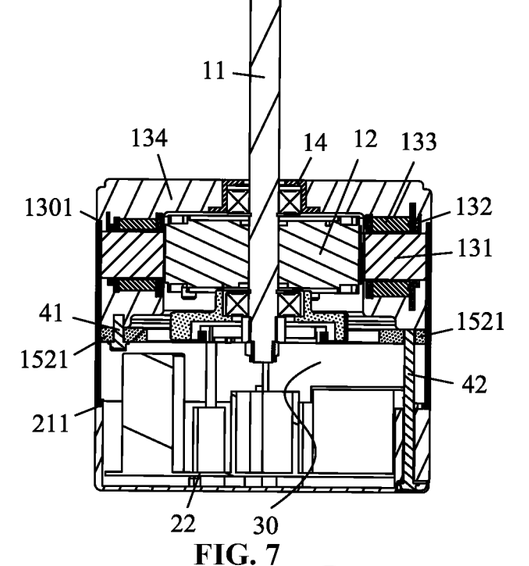
FIG. 7 is a cross-sectional view of a brushless direct current motor taken from line VII-VII in FIG. 6.

As shown in FIGS. 1-2, a typical brushless direct current (DC) motor includes a rotary shaft A1, a rotor assembly A2, a stator assembly A3, a shell A4, a front cover A5, a rear cover A6, a motor controller A7, and a plurality of screws A8. The rotor assembly A2 is disposed on the rotary shaft A1. The stator assembly A3 is integrated with the shell A4, and is sleeved on the outer side of the rotor assembly A2. The front cover A5 and the rear cover A6 are disposed on two ends of the shell A4 via the screws A8, and the motor controller A7 is disposed on the rear cover A6 via the screws A8. The installation of the conventional brushless DC motor is complex, inefficient, unreliable, and labor-consuming.

SUMMARY OF THE INVENTION

In view of the above-described problems, it is one objective of the invention to provide a brushless direct current (DC) motor which has a simple and compact structure, is convenient to assemble, and has relatively low material and labor force costs. In addition, the installation of the motor is convenient and reliable.

To achieve the above objective, in accordance with one embodiment of the invention, there is provided a brushless direct current (DC) motor, comprising a motor body and a motor controller. The motor controller comprises a control box and a control circuit board. The motor body is a plastic-packaged body, comprising a rotary shaft, a rotor assembly, a plastic-packaged stator, a front cover, and a rear cover. The rotor assembly is disposed on the rotary shaft. The plastic-packaged stator is sleeved on an outer side of the rotor assembly. The front cover is disposed on a front part of the plastic-packaged stator. The plastic-packaged stator comprises a stator core, a terminal insulator, coil windings, and a plastic-packaged shell. The terminal insulator is disposed on one end of the stator core. The coil windings are coiled on the terminal insulator. The plastic-packaged shell is adapted to connect the stator core, the terminal insulator, and the coil windings together. The plastic-packaged stator is sheathed in a shell sleeve. The shell sleeve comprises a rear end extending axially from a rear part of the plastic-packaged stator. The control box is disposed on a rear part of the shell sleeve, and a chamber is disposed between the control box and the shell sleeve. The rear cover and the control circuit board are disposed in the chamber.

In a class of this embodiment, the rear cover is disposed on the rear part of the plastic-packaged stator via a plurality of first screws. The control box is assembled with the rear cover via a plurality of second screws.

In a class of this embodiment, the rear cover comprises a bearing base, a cover body, and a plurality of connecting supports. The cover body is disposed on a periphery of the bearing base. The connecting supports is adapted to connect the bearing base and the cover body.

In a class of this embodiment, an outer edge of the cover body is provided with a plurality of mounting feet. The first screws pass through the mounting feet and are screwed in the rear part of the plastic-packaged stator, and the rear cover is disposed on the rear part of the plastic-packaged stator. The second screws pass through the control box and are screwed in the mounting feet, and the control box is assembled with the rear cover.

In a class of this embodiment, the mounting feet are eight in number, and the mounting feet is adapted to install the first screws and the mounting feet is adapted to install the second screws are circumferentially arranged at interval.

In a class of this embodiment, an accommodating chamber is disposed on a central part on a top of the bearing base. An installing support is disposed on the rotary shaft inside the accommodating chamber. The installing support is sheathed in a magnetic ring.

In a class of this embodiment, an outer wall surface of the plastic-packaged stator is provided with a first spigot. An end of the control box is provided with a second spigot. A front part and the rear part of the shell sleeve are supported on the first spigot and the second spigot, respectively.

In a class of this embodiment, the front cover is disposed on a front part of the plastic-packaged shell by plastic injection.

In a class of this embodiment, the plastic-packaged shell is adapted to connect the stator core, the terminal insulator, and the coil windings together. An outer surface of the stator core is exposed. The shell sleeve is sleeved on an outer side of the plastic-packaged stator and contacts with the exposed outer surface of the stator core.

In a class of this embodiment, the front part of the shell sleeve is provided with a notch, and the outer wall surface of the plastic-packaged stator is provided with a bump. The bump is disposed in the notch.

In a class of this embodiment, a top of the control box is provided with a slot, and the rear part of the shell sleeve is provided with a fixture block. The fixture block is disposed in the slot.

In a class of this embodiment, an outer surface of the shell sleeve is provided with a plurality of installing supports.

Advantages of the brushless DC motor according to embodiments of the invention are summarized as follows:

1. The brushless DC motor has a simple structure, and involves fewer parts and short assembling procedure, thus is convenient to assemble. The motor reduces the material and labor force costs. In addition, the installation of the motor is reliable, and after long time service, no loosening occurs.

2. The first screws pass through the mounting feet and are screwed in the rear part of the plastic-packaged stator, and the rear cover is disposed on the rear part of the plastic-packaged stator. The second screws pass through the control box and are screwed in the mounting feet, and the control box is assembled with the rear cover. The arrangement is simple and the assembly is convenient and reliable.

3. An accommodating chamber is disposed on a central part on a top of the bearing base. An installing support is disposed on the rotary shaft inside the accommodating chamber. The installing support is sheathed in a magnetic ring. The arrangement is simple and the assembly is convenient and reliable. The space inside the motor is effectively saved.

4. The outer wall surface of the plastic-packaged stator is provided with a first spigot. One end of the control box is provided with a second spigot. The front part and the rear part of the shell sleeve are supported on the first spigot and the second spigot, respectively. The arrangement is simple, and the positioning and installation are convenient and reliable. The assembly efficiency is effectively improved, and the production cost is reduced.

5. The shaft current generated by the plastic-packaged stator passes through the stator core, the shell sleeve, the control box and flows to the ground, because the motor controller comprises a grounding device. Thus the structure removes the shaft current and does not add to the cost. In addition, the arrangement is simple and the assembly is convenient. Most importantly, the structure removing the shaft current ensures the operation of the motor to be stable and reliable for a long time, and thus the motor has a long service life.

6. The front part of the shell sleeve is provided with a notch, and the outer wall surface of the plastic-packaged stator is provided with a bump. The bump is disposed in the notch, thus avoiding the rotation of the shell. The arrangement is simple and the assembly of the shell is reliable.

7. The shell sleeve is sleeved on the outer side of the plastic-packaged stator and contacts with the exposed outer surface of the stator core. The interference fit between the shell sleeve and the plastic-packaged stator ensures the connection to be reliable.

8. The top of the control box is provided with a slot, and the rear part of the shell sleeve is provided with a fixture block. The fixture block is disposed in the slot. The fixture block is coordinated with the slot to avoid the rotation of the shell.

9. Different installing supports are soldered to the outer wall of the shell sleeve to meet different installation requirements. And because the installing supports are soldered to the outer wall of the shell sleeve, the mold of the plastic-packaged stator is not changed, thus the assembly is convenient, and the production cost is saved.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a brushless direct current (DC) motor are described below. It should be noted that the following examples are intended to describe and not to limit the invention.

Example 1

As shown in FIGS. 3-7, a brushless direct current (DC) motor comprises a motor body 1 and a motor controller 2. The motor controller 2 comprises a control box 21 and a control circuit board 22. The motor body 1 is a plastic-packaged body, comprising a rotary shaft 11, a rotor assembly 12, a plastic-packaged stator 13, a front cover 14, and a rear cover 15. The rotor assembly 12 is disposed on the rotary shaft 11. The plastic-packaged stator 13 is sleeved on an outer side of the rotor assembly 12. The front cover 14 is disposed on a front part of the plastic-packaged stator 13. The plastic-packaged stator 13 comprises a stator core 131, a terminal insulator 132, coil windings 133, and a plastic-packaged shell 134. The terminal insulator 132 is disposed on one end of the stator core 131. The coil windings 133 are coiled on the terminal insulator 132. The plastic-packaged shell 134 is adapted to connect the stator core 131, the terminal insulator 132, and the coil windings 133 together. The plastic-packaged stator 13 is sheathed in a shell sleeve 3. A rear end of the shell sleeve 3 extends axially from a rear part of the plastic-packaged stator 13. The control box 21 is disposed on a rear part of the shell sleeve 3, and a chamber 30 is disposed between the control box 21 and the shell sleeve 3. The rear cover 15 and the control circuit board 22 are disposed in the chamber 30.

The rear cover 15 is disposed on the rear part of the plastic-packaged stator 13 via a plurality of first screws 41. The control box 21 is assembled with the rear cover 15 via a plurality of second screws 42. The rear cover 15 comprises a bearing base 151, a cover body 152, and a plurality of connecting supports 153. The cover body is disposed on a periphery of the bearing base 151. The connecting supports is adapted to connect the bearing base 151 and the cover body 152. An outer edge of the cover body 152 is provided with a plurality of mounting feet 1521. The first screws 41 pass through the mounting feet 1521 and are screwed in the rear part of the plastic-packaged stator 13, and the rear cover 15 is disposed on the rear part of the plastic-packaged stator 13. The second screws 42 pass through the control box 21 and are screwed in the mounting feet 1521, and the control box 21 is assembled with the rear cover 15. The mounting feet 1521 is eight in number, and the mounting feet 1521 is adapted to install the first screws 41 and the mounting feet 1521 is adapted to install the second screws 42 are circumferentially arranged at interval. An accommodating chamber 1510 is disposed on a central part on a top of the bearing base 151. An installing support 5 is disposed on the rotary shaft 11 inside the accommodating chamber 1510. The installing support 5 is sheathed in a magnetic ring 6. An outer wall surface of the plastic-packaged stator 13 is provided with a first spigot 1301. An end of the control box 21 is provided with a second spigot 211. A front part and the rear part of the shell sleeve 3 are supported on the first spigot 1301 and the second spigot 211, respectively. The front cover 14 is disposed on a front part of the plastic-packaged shell 134 by plastic injection. The plastic-packaged shell 134 is adapted to connect the stator core 131, the terminal insulator 132, and the coil windings 133 together. An outer surface of the stator core 131 is exposed. The shell sleeve 3 is sleeved on an outer side of the plastic-packaged stator 13 and contacts with the exposed outer surface of the stator core 131.

Example 2

Figure 8:
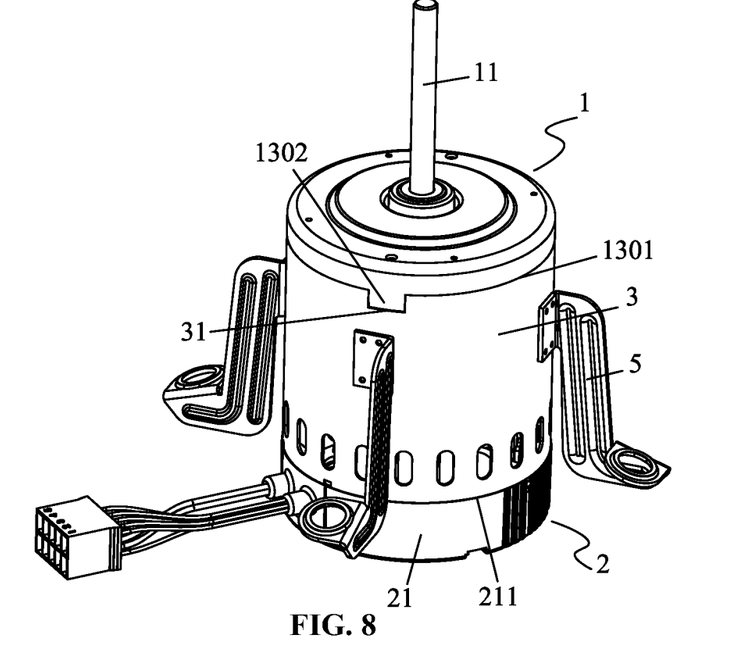
FIG. 8 is a stereogram of a brushless direct current motor in Example 2.
Figure 9:
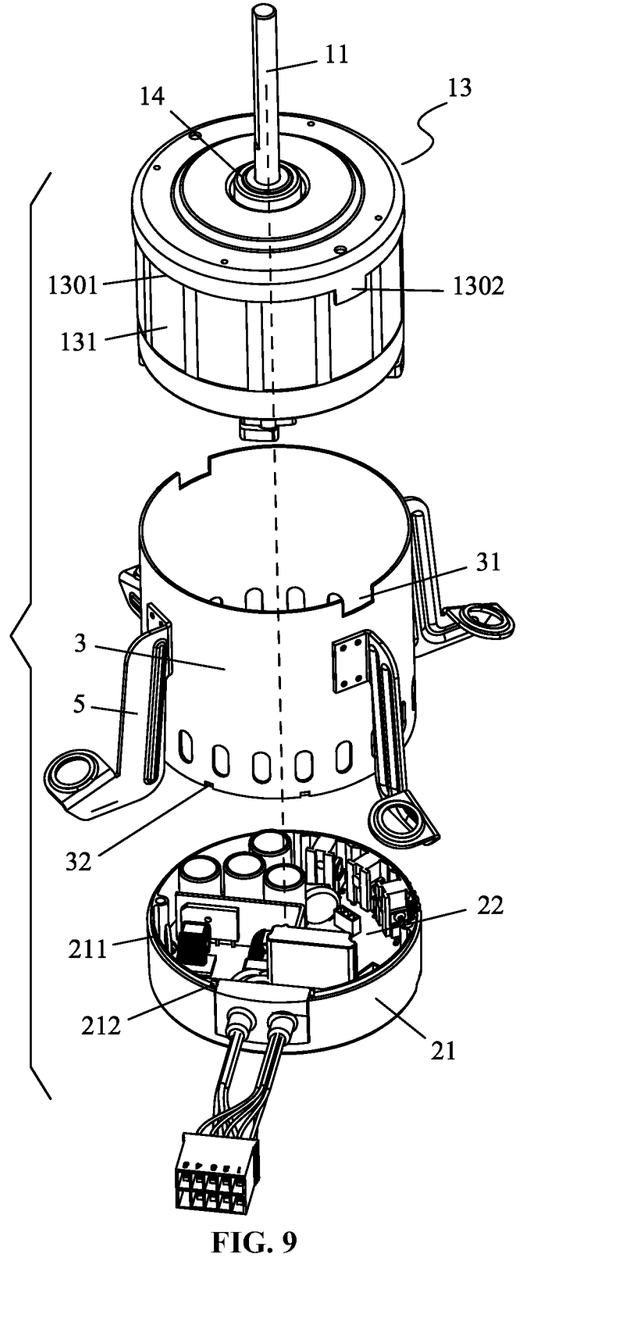
FIG. 9 is an exploded view of a brushless direct current motor in Example 2.

As shown in FIGS. 8-9, the example follows a basic structure of Example 1, except that the front part of the shell sleeve 3 is provided with a notch 31, and the outer wall surface of the plastic-packaged stator 13 is provided with a bump 1302. The bump 1302 is disposed in the notch 31. A top of the control box 21 is provided with a slot 212, and the rear part of the shell sleeve is provided with a fixture block 32. The fixture block 32 is disposed in the slot 212. An outer surface of the shell sleeve 3 is provided with a plurality of installing supports 5.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A brushless direct current motor, comprising:
a motor body; the motor body being a plastic-packaged body, and comprising a rotary shaft, a rotor assembly, a plastic-packaged stator, a front cover, and a rear cover; the plastic-packaged stator comprising a stator core, a terminal insulator, coil windings, and a plastic-packaged shell;
a motor controller; the motor controller comprising a control box and a control circuit board;
wherein:
the rotor assembly is disposed on the rotary shaft;
the plastic-packaged stator is sleeved on an outer side of the rotor assembly;
the front cover is disposed on a front part of the plastic-packaged stator;
the terminal insulator is disposed on one end of the stator core;
the coil windings are coiled on the terminal insulator;
the plastic-packaged shell is adapted to connect the stator core, the terminal insulator, and the coil windings together;
the plastic-packaged stator is sheathed in a shell sleeve;
the shell sleeve comprises a rear end extending axially from a rear part of the plastic-packaged stator;
the control box is disposed on a rear part of the shell sleeve, and a chamber is disposed between the control box and the shell sleeve;
the rear cover and the control circuit board are disposed in the chamber;
the rear cover is disposed on the rear part of the plastic-packaged stator via a plurality of first screws; and the control box is assembled with the rear cover via a plurality of second screws;
the rear cover comprises a bearing base, a cover body, and a plurality of connecting supports; the cover body is disposed on a periphery of the bearing base; and the connecting supports are adapted to connect the bearing base and the cover body; and
an outer edge of the cover body is provided with a plurality of mounting feet; each of the first screws extends through one of the mounting feet and is screwed in the rear part of the plastic-packaged stator; and each of the second screws extends through the control box and is screwed in one of the mounting feet.

2. The motor of claim 1, wherein the mounting feet are eight in number, and the mounting feet that are adapted to install the first screws and the mounting feet that are adapted to install the second screws are circumferentially arranged at interval.

3. The motor of claim 1, wherein an accommodating chamber is disposed on a central part on a top of the bearing base; an installing support is disposed on the rotary shaft inside the accommodating chamber; and the installing support is sheathed in a magnetic ring.

4. The motor of claim 2, wherein an accommodating chamber is disposed on a central part on a top of the bearing base; an installing support is disposed on the rotary shaft inside the accommodating chamber; and the installing support is sheathed in a magnetic ring.

5. The motor of claim 2, wherein an outer wall surface of the plastic-packaged stator is provided with a first spigot; an end of the control box is provided with a second spigot; and a front part and the rear part of the shell sleeve are supported on the first spigot and the second spigot, respectively.

6. The motor of claim 2, wherein the front cover is disposed on a front part of the plastic-packaged shell by plastic injection.

7. The motor of claim 2, wherein the plastic-packaged shell is adapted to connect the stator core, the terminal insulator, and the coil windings together, wherein an outer surface of the stator core is exposed; and the shell sleeve is sleeved on an outer side of the plastic-packaged stator and contacts with the exposed outer surface of the stator core.

8. The motor of claim 2, wherein the front part of the shell sleeve is provided with a notch, and an outer wall surface of the plastic-packaged stator is provided with a bump; and the bump is disposed in the notch.

9. The motor of claim 2, wherein a top of the control box is provided with a slot, and the rear part of the shell sleeve is provided with a fixture block; and the fixture block is disposed in the slot.

10. The motor of claim 2, wherein an outer surface of the shell sleeve is provided with a plurality of installing supports.

* * * * *